(12) United States Patent
Mondini

(10) Patent No.: US 12,251,868 B2
(45) Date of Patent: Mar. 18, 2025

(54) APPARATUS FOR MAKING CONTAINERS WHICH COMPRISE A SUPPORTING SKELETON AND A LAYER OF THERMOFORMABLE MATERIAL COUPLED TO THE SUPPORTING SKELETON

(71) Applicant: G.MONDINI S.P.A., Cologne (IT)

(72) Inventor: Giovanni Mondini, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 243 days.

(21) Appl. No.: 17/864,466

(22) Filed: Jul. 14, 2022

(65) Prior Publication Data

US 2023/0018304 A1 Jan. 19, 2023

(30) Foreign Application Priority Data

Jul. 19, 2021 (IT) .......................... 102021000019046

(51) Int. Cl.
*B29C 51/26* (2006.01)
*B29C 51/18* (2006.01)
(Continued)

(52) U.S. Cl.
CPC ............ *B29C 51/261* (2013.01); *B29C 51/18* (2013.01); *B29C 51/44* (2013.01); *B29C 65/48* (2013.01);
(Continued)

(58) Field of Classification Search
None
See application file for complete search history.

(56) References Cited

U.S. PATENT DOCUMENTS 10,625,462 B2 4/2020 Mondini
2003/0034118 A1* 2/2003 Alawadi ............... B29C 51/262
156/221

(Continued)

FOREIGN PATENT DOCUMENTS

CA 2353684 A1 12/1999
DE 4033534 A1 4/1992
(Continued)

*Primary Examiner* — Jacob T Minskey
*Assistant Examiner* — Caroline Beha
(74) *Attorney, Agent, or Firm* — Chrisman Gallo Tochtrop LLC

(57) ABSTRACT

An apparatus for making containers (2) comprising a rotor (6) rotatably mounted on a supporting structure (5), a thermoforming device (7) comprising a supporting unit (11) mounted on the rotor (6) and a closing unit (12) which is stationary relative to the rotation of the rotor (6), a feeding device (8) for feeding to the supporting unit (11) a first article (13) for making a supporting skeleton (3), a positioning device (16) for positioning a sheet of thermoformable material (14) between the supporting unit (11) and the closing unit (12), and an extracting device (9) configured to extract the containers (2) from the supporting unit (11), the rotor (6) rotating in a stepping fashion to position the supporting unit (11) one after another in a loading predetermined angular position in which the feeding device (8) feeds a first article (13) to it, a thermoforming predetermined angular position in which the closing unit (12) and the supporting unit (11) are coupled for thermoforming the sheet of thermoformable material (14) on the first article (13), and an unloading predetermined angular position in which the extracting device (9) picks up the finished container (2) from the supporting unit (11).

20 Claims, 16 Drawing Sheets

(51) Int. Cl.
*B29C 51/44* (2006.01)
*B29C 65/48* (2006.01)
*B29L 31/00* (2006.01)
*B29K 101/12* (2006.01)

(52) U.S. Cl.
CPC ..... *B29K 2101/12* (2013.01); *B29L 2031/712* (2013.01)

(56) References Cited

U.S. PATENT DOCUMENTS

2006/0278654 A1\* 12/2006 Huber .................. B65G 57/165
  221/175
2017/0320256 A1\* 11/2017 Mondini ................. B29C 51/18

FOREIGN PATENT DOCUMENTS

| DE | 102004050917 A1 \* | 4/2006 | ........... B65G 47/918 |
|----|--------------------|--------|-------------------------|
| EP | 1604803 A1 | 12/2005 | |
| EP | 3366455 A1 | 8/2018 | |
| WO | 9967143 A2 | 12/1999 | |

\* cited by examiner

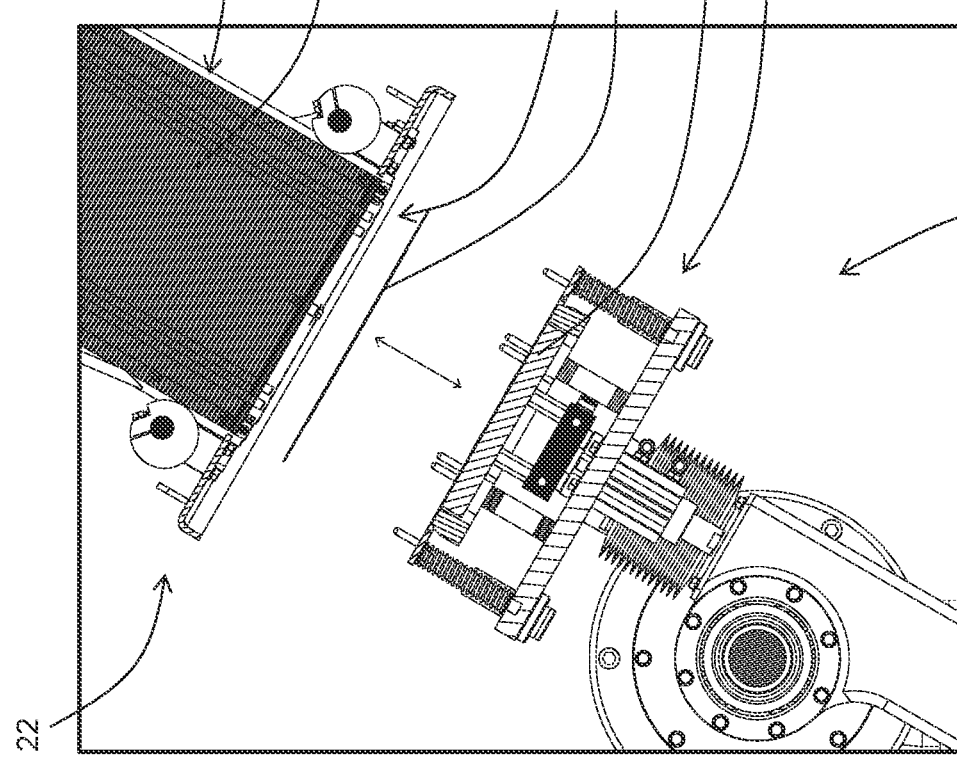
FIG. 12
FIG. 13

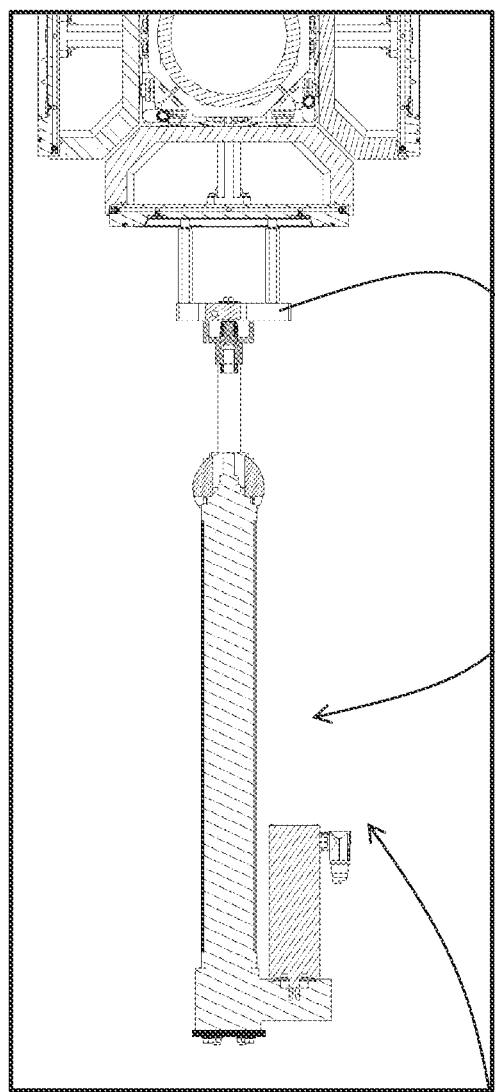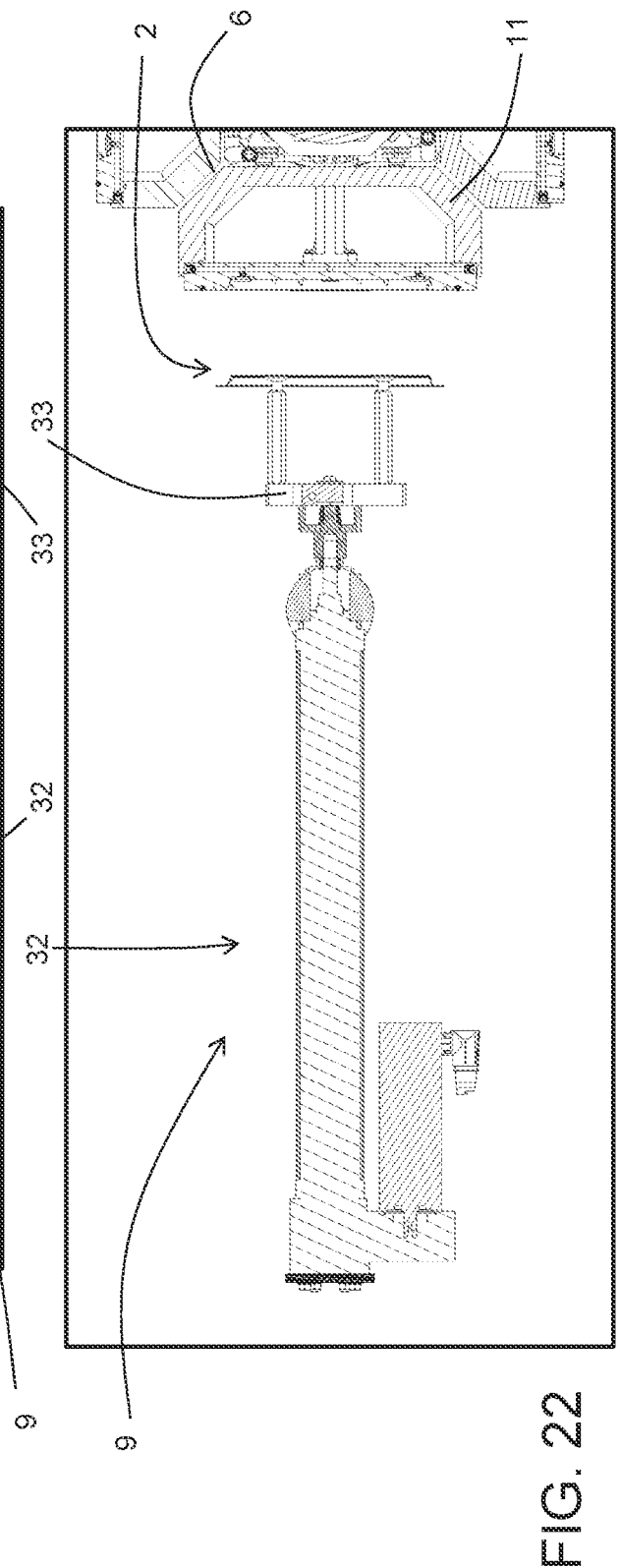

APPARATUS FOR MAKING CONTAINERS WHICH COMPRISE A SUPPORTING SKELETON AND A LAYER OF THERMOFORMABLE MATERIAL COUPLED TO THE SUPPORTING SKELETON

This invention relates to an apparatus for making containers which comprise a supporting skeleton and a layer of thermoformable material coupled to the supporting skeleton.

The containers for which this invention is intended are containers which overall have a tray or tub shape, and in which the outer part (that is to say the part facing away from the product) is constituted of the supporting skeleton, and the inner part (the part in contact with the product) is constituted of the layer of thermoformable material. Advantageously, the thermoformable material may be a thermoplastic material.

In the vast majority of cases, in prior art containers of this type the supporting skeleton is constituted of a paper and cardboard industry article, that is to say, a cellulose material-based article (paper, cardboard or paperboard).

In spite of that, this invention is not linked to the material of which the supporting skeleton is constituted.

At present, containers of this type may be classed in many different types as regards the structure of the supporting skeleton.

A distinction may be made, for example, between containers in which the supporting skeleton is constituted of a single article, and those in which the supporting skeleton is constituted of multiple articles.

In the context of this invention, the term article indicates what is used to, entirely or partly, create the supporting skeleton. In most applications, the article is a paper and cardboard industry article which comprises one or more sheets of cellulose material; those one or more sheets may be spread out, or folded on themselves, without glue or partly glued on themselves or to each other, they may or may not have fold lines, etc.

Furthermore, there are cases in which each article comprises a plurality of panels of material which are connected to each other, and is provided with fold lines. Each article, usually initially has a spread out configuration, that is to say, like a flat element which extends mainly in one plane; only during use can it be brought into a three-dimensional configuration corresponding to the shape of the supporting skeleton to be formed, advantageously by means of suitable folds of the various panels or shaping of its parts. In other cases, in contrast, the article defines a single panel without fold lines; in the cases in which it is converted to a three-dimensional form, that article is adapted to the shape of the mould by simply creating creases in the zones where the material accumulates (for example at the corners).

Moreover, in some cases the supporting skeleton is completely flat, in other cases it is mainly flat but has at least one raised edge, and in yet other cases, it has a three-dimensional structure which extends significantly in terms of width, length and height.

In some embodiments in which the supporting skeleton is also present at a flat upper flange of the container 2, that portion of the skeleton is constituted of a continuous annular frame. In contrast, in other embodiments, the annular frame is constituted of a plurality of pieces arranged side by side.

This invention can be applied with any type of starting article.

In fact the prior art technology has several disadvantages with regard to the ways of making the containers. So far, there are no prior art apparatuses on the market which allow the best possible management of automated production of the containers; the containers are therefore made with traditional thermoforming apparatuses also adapted for processing with the articles inserted in the thermoforming moulds.

In this context the technical purpose which forms the basis of this invention is to provide an apparatus for making containers which comprise a supporting skeleton and a layer of thermoformable material coupled to the supporting skeleton, which overcomes that disadvantage.

In particular the technical purpose of this invention is to provide an apparatus for making containers which comprise a supporting skeleton and a layer of thermoformable material coupled to the supporting skeleton, which allows the entire container 2 to be made in an automated way starting from its starting constituent parts, the sheet of thermoformable material, and one or more articles intended for making the supporting skeleton.

The technical purpose indicated is achieved by an apparatus for making containers which comprise a supporting skeleton and a layer of thermoformable material coupled to the supporting skeleton, as described in the appended claim 1. Particular advantages are obtained with the embodiments in the dependent claims.

Further features and the advantages of this invention will be more apparent in the detailed description of a preferred, non-limiting embodiment of an apparatus for making containers which comprise a supporting skeleton and a layer of thermoformable material coupled to the supporting skeleton, illustrated in the accompanying drawings, in which:

FIGS. 12 to 24 show, one after another, some of the main components of FIG. 11 during the entire progress of the example production cycle.

Figure 1:
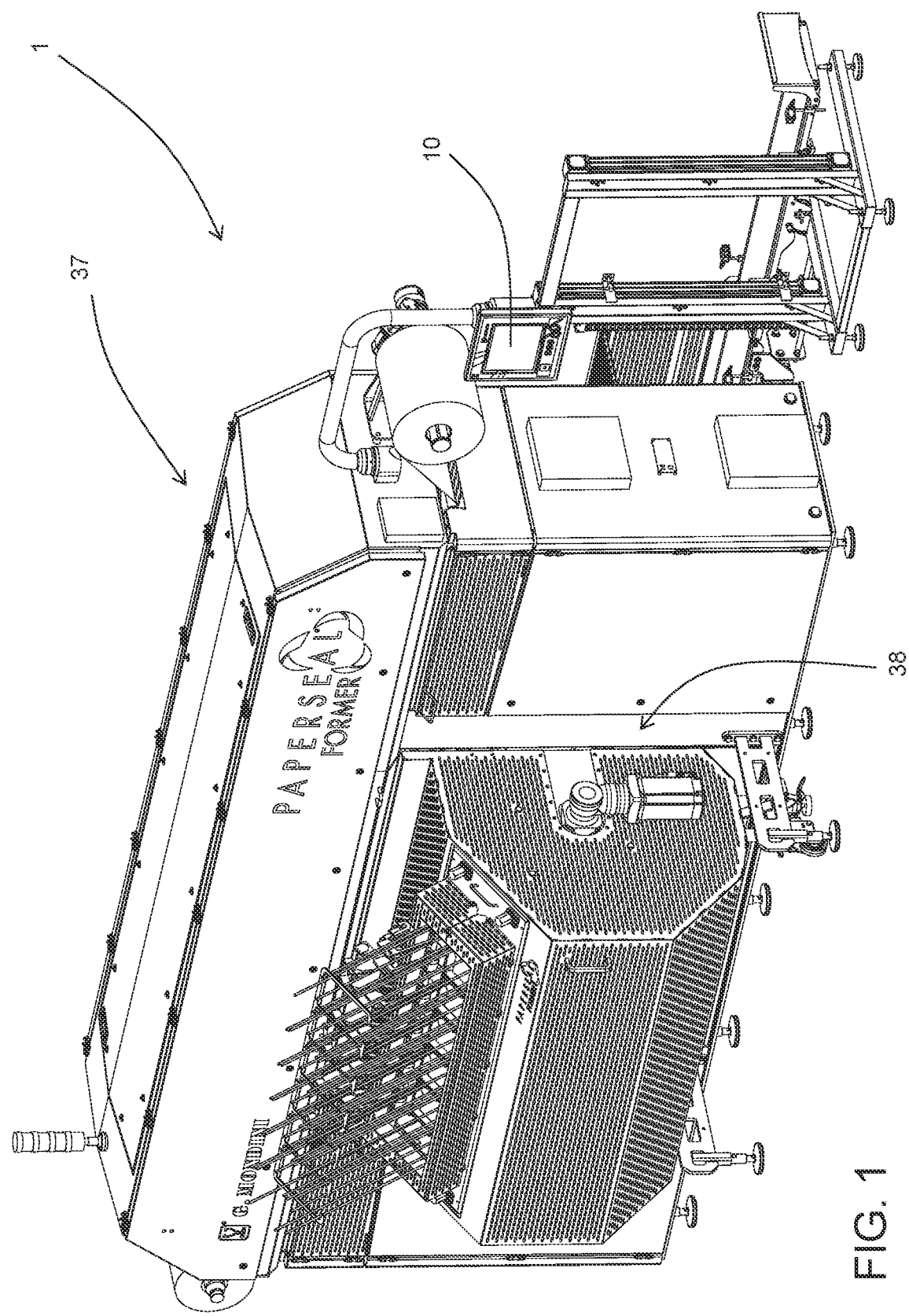
FIG. 1 is an axonometric three-quarter view of an apparatus made in accordance with this invention in an operating configuration.

With reference to the above-mentioned figures the reference number 1 denotes in its entirety an apparatus according to this invention, for making containers 2 which comprise a supporting skeleton 3 and a layer of thermoformable material 4 coupled to the supporting skeleton 3.

FIGS. 1 to 10 show a preferred embodiment of this invention, in which the apparatus 1 is capable of simultaneously making six different containers 2, as well as partly making further groups of six containers 2 in the time necessary to make the first six. However, the fact remains that, as described below, an apparatus 1 according to this invention may be designed to simultaneously make a different number of containers 2, or to simultaneously process only one group of containers 2.

In its most general configuration, the apparatus 1 according to this invention comprises the following main parts: a supporting structure 5, a rotor 6, at least one thermoforming device 7, at least one feeding device 8 and at least one extracting device 9.

The rotor 6 is mounted on the supporting structure 5 and is rotatable around a main axis of rotation which in the preferred embodiments is horizontal. The rotor 6 is also motor-driven and its rotation is driven by a motor controlled by an electronic control unit 10 of the apparatus 1. In particular, the rotor 6 is configured and controlled in such way as to rotate around the main axis of rotation in a single direction of rotation and with a stepping movement, in which periods of rotation are alternated with periods in which the rotor 6 remains stationary. That movement is advantageously obtained by means of controlled operation of the motor by the electronic control unit 10 (which also controls all of the other devices of the apparatus).

The thermoforming device 7 is associated with the rotor 6 and comprises at least one supporting unit 11 and one closing unit 12. The supporting unit 11 is configured to support both one or more articles 13 for making the supporting skeleton 3 of the container 2, and the finished container 2. In contrast, the closing unit 12 is intended to couple to the supporting unit 11, as explained in more detail below, to define with it a thermoforming chamber by means of which a sheet of thermoformable material 14 is thermoformed and applied to the supporting skeleton 3 already positioned on the supporting unit 11.

In accordance with one of the main aspects of this invention, the supporting unit 11 is mounted on the rotor 6, whilst the closing unit 12 is mounted on the supporting structure 5 in such a way that it is stationary relative to the rotation of the rotor 6. That means that the supporting unit 11 is located in a position such that it allows its coupling to the closing unit 12, only when the rotor 6 is located in a thermoforming predetermined angular position, something which happens once per revolution of the rotor 6.

The already described stepping movement of the rotor 6, is performed in such a way as to position the supporting unit 11 at a plurality of predetermined angular positions one after another, which are distributed around the main axis of rotation, one of which corresponds to the thermoforming predetermined angular position, in which the supporting unit 11 can be coupled to the closing unit 12.

When the supporting unit 11 is positioned in the thermoforming predetermined angular position, at least one of either the closing unit 12 or the supporting unit 11 is movable relative to the other between a disengaged position, in which they are spaced apart and allow the rotation of the rotor 6, and an operating position in which they are coupled for thermoforming the sheet of thermoformable material 14 on the supporting skeleton 3. In the preferred embodiments, it is the closing unit 12 which moves, whilst the supporting unit 11 is stationary relative to the rotor 6.

In the preferred embodiments, the thermoforming device 7 comprises a closing unit 12 fixed to the supporting structure 5, and a plurality of supporting units 11 mounted on the rotor 6 and distributed around the main axis of rotation. The supporting units 11 are positioned in such a way that with each step of the rotation of the rotor 6, each supporting unit 11 shifts from one predetermined angular position to another predetermined angular position immediately after it. Moreover, with each step of the rotor 6, a different supporting unit 11 is positioned at the thermoforming predetermined angular position, so that the different supporting units 11 are couplable alternatively and one after another to the closing unit 12. Each supporting unit 11 couples to the closing unit 12 once per revolution of the rotor 6.

Advantageously, when a plurality of supporting units 11 is mounted on the rotor 6, the angle of rotation which separates two predetermined angular positions is constant, and the number of predetermined angular positions is equal to the number of supporting units 11 which are part of the thermoforming device 7.

In the preferred embodiments, each supporting unit 11 present comprises a shaped housing 15, into which, during operation, first the supporting skeleton 3 and then the thermoformed sheet of thermoformable material 14 can be inserted.

Associated with the thermoforming device 7 there is a positioning device 16 for positioning the sheet of thermoformable material 14 between the supporting unit 11, placed in the thermoforming predetermined angular position, and the closing unit 12. The positioning device 16 is configured to position the sheet of thermoformable material 14 between the supporting unit 11 and the closing unit 12, when the supporting unit 11 and the closing unit 12 are in the disengaged position and before they adopt the operating position.

In the context of this invention, the thermoformable material may be of any type suitable for the purpose. For example it may be constituted of a material which comprises a layer of plastic material, a fibre-based layer, a layer of cellulose material, a layer of aluminium, or a combination of one or more of those layers. In a preferred embodiment, the thermoformable material is a thermoplastic material.

In some embodiments, such as that illustrated in the accompanying figures, the positioning device 16 comprises unwinding means 17 for unwinding a reel 18 of a web 19 of the thermoformable material, cutting means 20 for cutting the sheet of thermoformable material 14 from the web 19, and, alternatively, shifting means for shifting either the web 19 of thermoformable material or the sheet of thermoformable material 14 to a stand-by position in which it is interposed between the supporting unit 11 and the closing unit 12.

In some embodiments, the sheet of thermoformable material 14 is cut from the web 19 by cutting means 20 associated with the thermoforming device 7; the cutting may take place simultaneously with the change to the operating position, or after the thermoforming has been carried out.

In the embodiment illustrated in the accompanying figures, the sheets of thermoformable material are cut from the web 19 without interrupting the continuity of the web 19 itself; the positioning device 16 also comprises take-up means 21 for winding up the residual web 19.

In other embodiments, in contrast the positioning device 16 is configured to position between the supporting unit 11 and the closing unit 12 the thermoformable material already cut into sheets. Those sheets may be cut to size relative to the extent of the trays or larger. Moreover they may be further cut inside the apparatus similarly to what is described above.

Finally, the sheets may be fed by means of a suitable storage unit, or they may in turn be cut from a web.

Both the unwinding means 17 and the take-up means 21 advantageously comprise a motor-driven roller for the support for the reels of web 19.

The feeding device 8 is configured to feed a first article 13 for making the supporting skeleton 3 to the supporting unit 11, when the supporting unit 11 is at a loading predetermined angular position, placed upstream of the thermoforming predetermined angular position, relative to the direction of movement of the supporting unit 11 during a cycle for making a container 2.

In the context of this invention, in some embodiments the supporting skeleton 3 made is cellulose material-based, advantageously, paper, paperboard or cardboard. However, in other embodiments, the supporting skeleton 3 may even be made with other materials. By way of example it may be made of fossil-based plastics, bio-based plastics, natural plastic, biodegradable or compostable plastic, mixtures of the preceding materials, aluminium, lignin, or with a multi-layer laminated or coupled material based on one or more of those previously indicated.

In some embodiments, the first article 13 is already shaped and constitutes the supporting skeleton 3; in other words, in these embodiments the feeding device 8 is configured to feed to the supporting unit 11 directly the supporting skeleton 3 already ready for use.

Otherwise, in other embodiments such as that illustrated in the accompanying figures, the supporting skeleton 3 is advantageously obtained by shaping at least one first article 13 made with one or more of the materials indicated above. The first article 13 may advantageously be constituted of a single sheet, or of a plurality of coupled sheets.

Advantageously, the first article 13 is fed to the apparatus 1 in its spread out or flattened configuration, and, if necessary, the first article 13 is switched to its three-dimensional configuration inside the supporting unit 11.

In the context of this invention, the first article 13 may adopt any form suitable for the purpose, in particular any form already used for making the type of containers 2 for which this invention is intended. By way of example, the first article 13 may be constituted of a single sheet which is shaped or configured to be shaped by means of a localised creasing, of a single sheet equipped with a plurality of folded or foldable panels, of multiple coupled sheets equipped with a plurality of folded or foldable panels, etc. In general what was described above relative to the articles 13 used in the prior art applies.

In some embodiments, the feeding device 8 comprises a first feeder 22 for feeding first articles 13 and a first transfer device 23 for transferring a first article 13 from the first feeder 22 to the supporting unit 11.

Advantageously the first feeder 22 for feeding first articles 13 is a storage unit in which the first articles 13 are stacked on top of each other. The storage unit in itself is of the known type, and has a lower opening 24 equipped with retaining means configured in such a way as to retain the stack 26 of first articles 13 in the absence of stresses, and to allow extraction of a first article 13 in the ways indicated below; advantageously the retaining means are active at the edges of the first article 13 at the base of the stack 26.

If the first articles 13 are already shaped and constitute the supporting skeleton 3, the first feeder 22 will be configured in a way suitable for being able to contain them.

The first transfer device 23 is switchable between a first configuration, in which it is coupled to the first feeder 22 for picking up a first article 13, and a second configuration, in which it is coupled to the supporting unit 11 for releasing the first article 13 to it.

In some embodiments, the first transfer device 23 comprises an extendable arm 27, rotatably connected to the supporting structure 5 according to a first secondary axis of rotation (horizontal in the accompanying figures) and capable of rotating between a first position, in which it is facing the first feeder 22, and a second position, in which it is facing the supporting unit 11 placed in the loading predetermined angular position. The extendable arm 27 is equipped with a gripping head 28 and, in both of the positions which it can adopt, it is switchable between a retracted configuration, in which the gripping head 28 is spaced apart from the first feeder 22 or from the supporting unit 11, and an extended configuration, in which the gripping head 28 is coupled to the first feeder 22 or to the supporting unit 11. The extendable arm 27 is also equipped with first suction means associated with the gripping head 28 and configured to retain a first article 13 on the gripping head 28. Second suction means 29 are advantageously associated with each supporting unit 11 and extend inside the rotor 6.

In some embodiments, the supporting skeleton 3 is made using not just the first article 13, but also a second article. By way of example, as described for example in patent application WO 1999/067143 A2, the supporting skeleton 3 may comprise a first article 13 which defines the bottom wall and partly defines the lateral walls, and a second article which defines a continuous upper flange and partly defines the lateral walls (in the above-mentioned patent application both the first article 13 and the second article are constituted of sheets of cellulose material which have a plurality of foldable panels). At least one of the two articles may be equipped with an adhesive, for example heat-activatable during the thermoforming of the coating film.

In these embodiments the feeding device 8 is advantageously configured to feed one after another to the supporting unit 11, both the first article 13, and the second article for making the supporting skeleton 3.

In some embodiments, the feeding device 8 is configured to feed both the first article 13, and the second article, at a same predetermined angular position (the loading predetermined angular position).

In other embodiments, in contrast, the feeding device 8 is configured to feed to the supporting unit 11 the first article 13 at one predetermined angular position (a first loading predetermined angular position), and the second article at a different predetermined angular position (a second loading predetermined angular position).

In both cases, the feeding device 8 comprises a second feeder for feeding second articles 13, whose characteristics may be the same as described above regarding the first feeder 22 for feeding first articles 13.

In some embodiments, the first transfer device 23 is used both for the first articles 13 and for the second articles 13; in that case it is advantageously also switchable to a third configuration in which it is coupled to the second feeder for picking up a second article. If the first transfer device 23 comprises the extendable arm 27, the latter is also capable of rotating to a third position, in which it is facing the second feeder. The operation of loading the first article 13 and the second article in the supporting unit 11, in this case involves the extendable arm 27 first moving to the first position picking up the first article 13, then to the second position for releasing the first article 13 in the supporting unit 11, then to the third position to pick up the second article, and finally again to the second position for also releasing the second article in the supporting unit 11.

In some embodiments, in contrast, the feeding device 8 comprises a second transfer device for transferring the second article from the second feeder to the supporting unit 11. Advantageously, the second transfer device is completely similar to the first transfer device 23, and is therefore switchable between a first configuration, in which it is coupled to the second feeder for picking up a second article, and a second configuration, in which it is coupled to the supporting unit 11 for releasing the second article to it. The second transfer device may also comprise an extendable arm 27 completely similar to that described above regarding the first transfer device 23. When the second transfer device is present, the two different loading predetermined angular positions are advantageously provided.

In some embodiments, the feeding device 8 may also comprise a gluing unit suitable for applying an adhesive to at least one of either the first article 13 or the second article, at a zone of them intended for superposing them in the final container.

Figure 15:
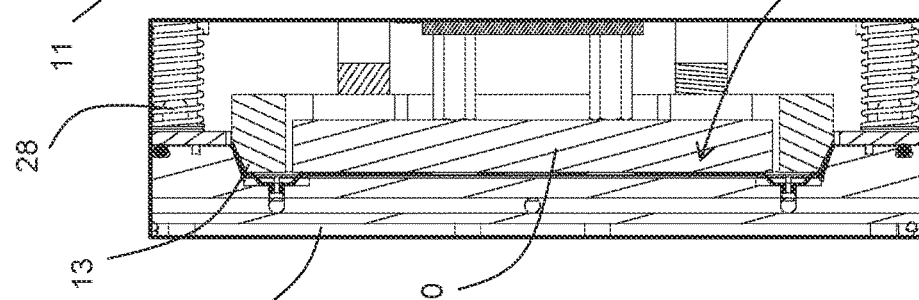

In some embodiments, the feeding device 8 is also configured to push the first article 13, and if necessary the second article, into the shaped housing 15, deforming them in such a way as to make them substantially adopt the three-dimensional configuration which they must have in the supporting skeleton 3. For that purpose, the first transfer device 23, or respectively the second transfer device, comprises a thrust unit 30; when, respectively, the first transfer device 23 or the second transfer device is in the second configuration, the thrust unit 30 is movable between a retracted position, in which it is located outside the shaped housing 15 (visible in FIG. 12), and a forward position (FIG. 15), in which it is inserted inside the shaped housing 15 for, in use, deforming, respectively, the first article 13 or the second article inside the shaped housing 15.

The extracting device 9 is configured to pick up and extract a finished container 2 from the supporting unit 11, when the supporting unit 11 is at an unloading predetermined angular position, which is placed downstream of the thermoforming predetermined angular position relative to the direction of forward movement of the supporting unit 11. The extracting device 9 is configured to extract the containers 2 from the supporting unit 11.

In some embodiments, associated with the extracting device 9 there is an outfeed conveyor 31, on which the extracting device 9 releases the containers 2 picked up from the supporting unit 11. In that case, the extracting device 9 comprises at least one pick-up unit 32, movable between a gripping position, in which it is coupled to the supporting unit 11 for gripping a container 2 placed in the supporting unit 11, and a releasing position, in which it is coupled to the outfeed conveyor 31 for releasing the container 2 on the outfeed conveyor 31. Advantageously, the pick-up unit 32 is configured to release a plurality of containers 2 one on top of another creating a pack of containers 2, as illustrated by way of example in FIG. 9.

The structure of the pick-up unit 32 is similar to that of the extendable arm 27 of the feeding device 8. In fact, the pick-up unit 32 too is rotatably connected to the supporting structure 5 according to a second secondary axis of rotation (horizontal in the accompanying figures), and can rotate between a first position, in which it is associated with the supporting unit 11 placed in the unloading predetermined angular position, and a second position, in which it is associated with the outfeed conveyor 31.

The pick-up unit 32 is equipped with a gripping unit 33 and, in each position, is switchable between a retracted configuration, in which the gripping unit 33 is spaced apart from the supporting unit 11 or from the outfeed conveyor 31, and an extended configuration, in which the gripping unit 33 is coupled to the supporting unit 11 or to the outfeed conveyor 31. The pick-up unit 32 is also equipped with third suction means, associated with the gripping unit 33 and configured to retain a container 2 on the gripping unit 33.

In some embodiments, the outfeed conveyor 31 comprises a lowered stretch 34 and a movable stretch 35.

The lowered stretch 34 is positioned near the floor and the pick-up unit 32 is associated with it when it is in the releasing position. Usually, the further the lowered stretch 34 is vertically from the main axis of rotation of the rotor 6, the more containers 2 can be stacked in each pack 36 created by the pick-up unit 32.

The movable stretch 35 is placed downstream of the lowered stretch 34 relative to a forward movement path of the containers 2 on the outfeed conveyor 31. The movable stretch 35 is configured to shift between a first position, in which it is aligned with the lowered stretch 34 for receiving the containers 2 from the lowered stretch 34 (FIG. 9), and a second position in which it is placed at a height higher than the first position (FIG. 10), in such a way as to be able to feed the containers 2 to other apparatuses in which the conveying systems for the containers 2 are placed at a higher height.

In some embodiments, such as that of FIG. 1, the apparatus 1 comprises a plurality of thermoforming devices 7 (six in FIG. 1) each of which comprises one or more supporting units 11 which are fixed to the rotor 6, and a closing unit 12 which is stationary relative to the rotor 6. The supporting units 11 of each thermoforming device 7 are mounted on the rotor 6 alongside each other along a line parallel to the main axis of rotation and are movable together in each predetermined angular position. The closing units 12 are configured to simultaneously interact with the respective supporting units 11.

In some embodiments, a single feeding device 8 and a single extracting device 9 are associated with the rotor 6 for all of the thermoforming devices 7 (solution illustrated in the accompanying figures). In other embodiments, in contrast, it is possible to have a feeding device 8 and an extracting device 9 for each thermoforming device 7 (solution not illustrated).

There is advantageously a single positioning device 16 for all of the thermoforming devices 7, at least if the sheets of thermoformable material are to be cut from a web 19.

In other embodiments not illustrated, the apparatus 1 may also comprise a plurality of thermoforming devices 7 which are positioned at a same point along the main axis of rotation. The supporting units 11 of each thermoforming device 7 are therefore mounted on the rotor 6 alongside each other along a line tangential to the main axis of rotation, and are movable together in each predetermined angular position. In this case too, each thermoforming device 7 may comprise one or more supporting units 11 mounted on the rotor 6, and a closing unit 12 mounted on the supporting structure 5 in such a way that it is stationary relative to the rotation of the rotor 6. The closing units 12 are configured to simultaneously interact with the respective supporting units 11. With reference for example to the rotor 6 visible in FIG. 15, that means that if the apparatus 1 were to comprise N thermoforming devices 7, on each of the four sides of the rotor 6 which are visible in the figure, rather than a single supporting unit 11, there would be N coplanar supporting units 11 present. Embodiments are also possible in which the apparatus 1 comprises a plurality of thermoforming devices 7 along the main axis of rotation and a plurality of thermoforming devices 7 at a same portion of the main axis of rotation.

Figure 2:
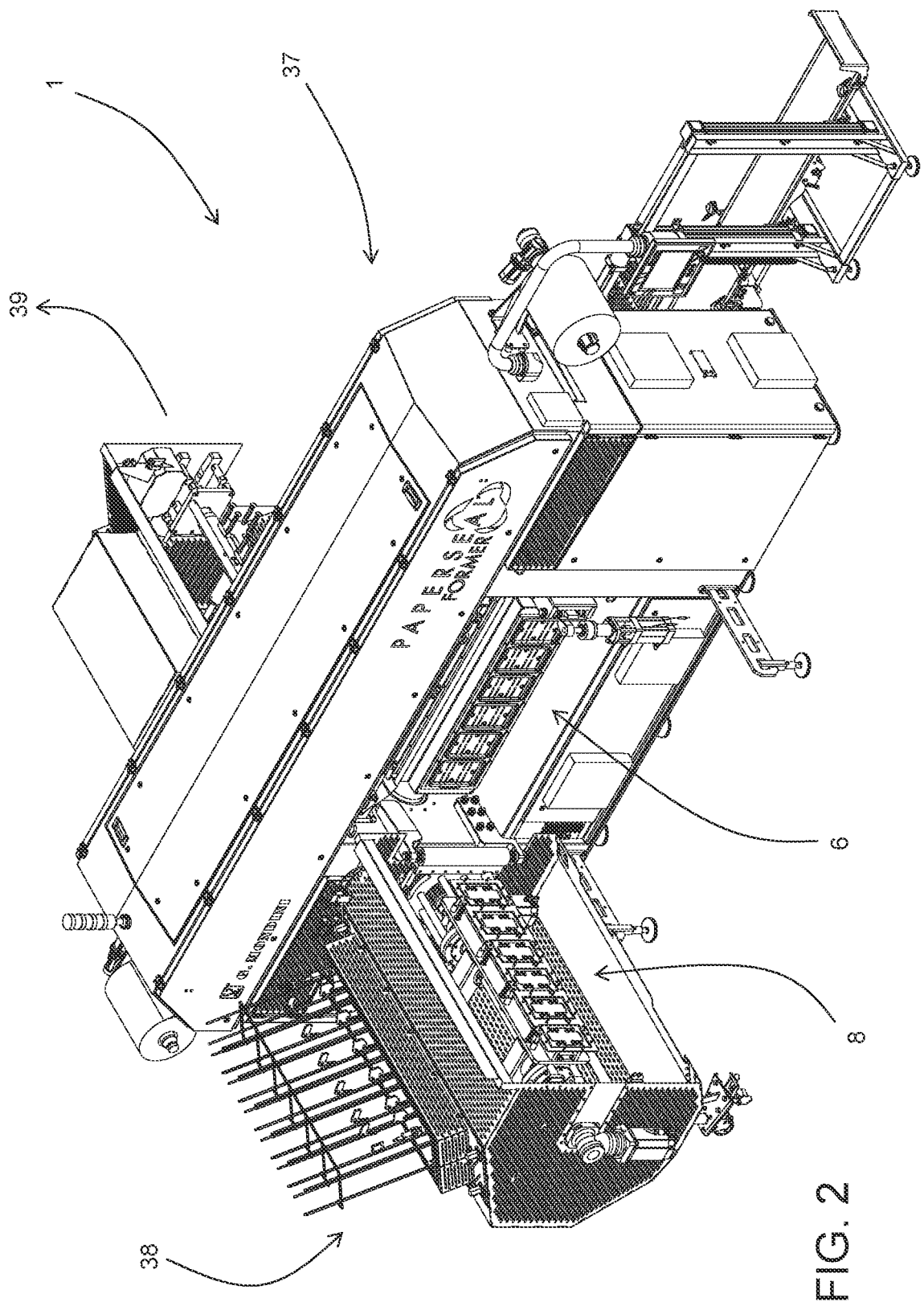
FIG. 2 is another axonometric view of the apparatus of FIG. 1 in a maintenance configuration.
Figure 3:
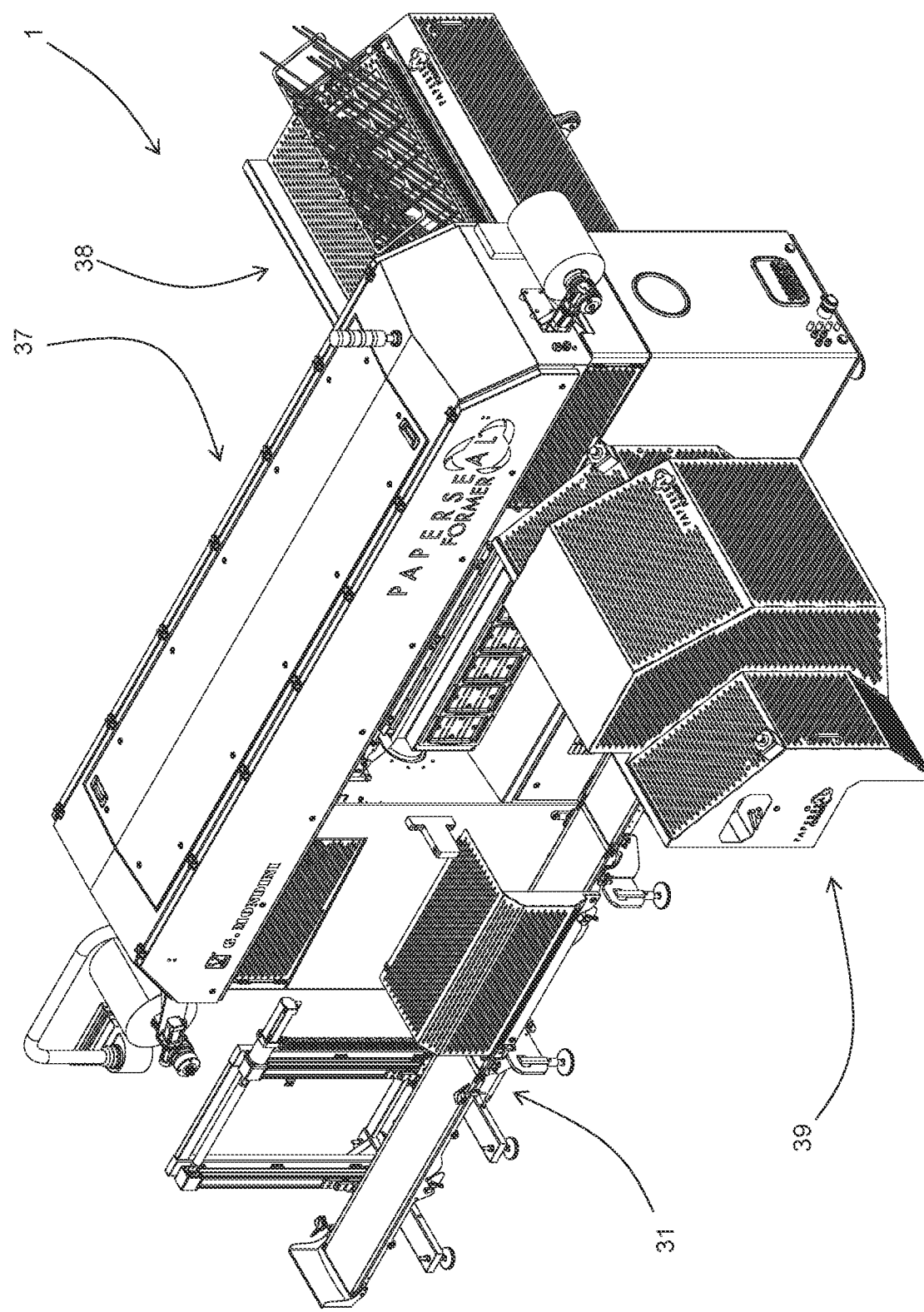
FIG. 3 is an axonometric view from the opposite side, of the apparatus of FIG. 2.
Figure 4:
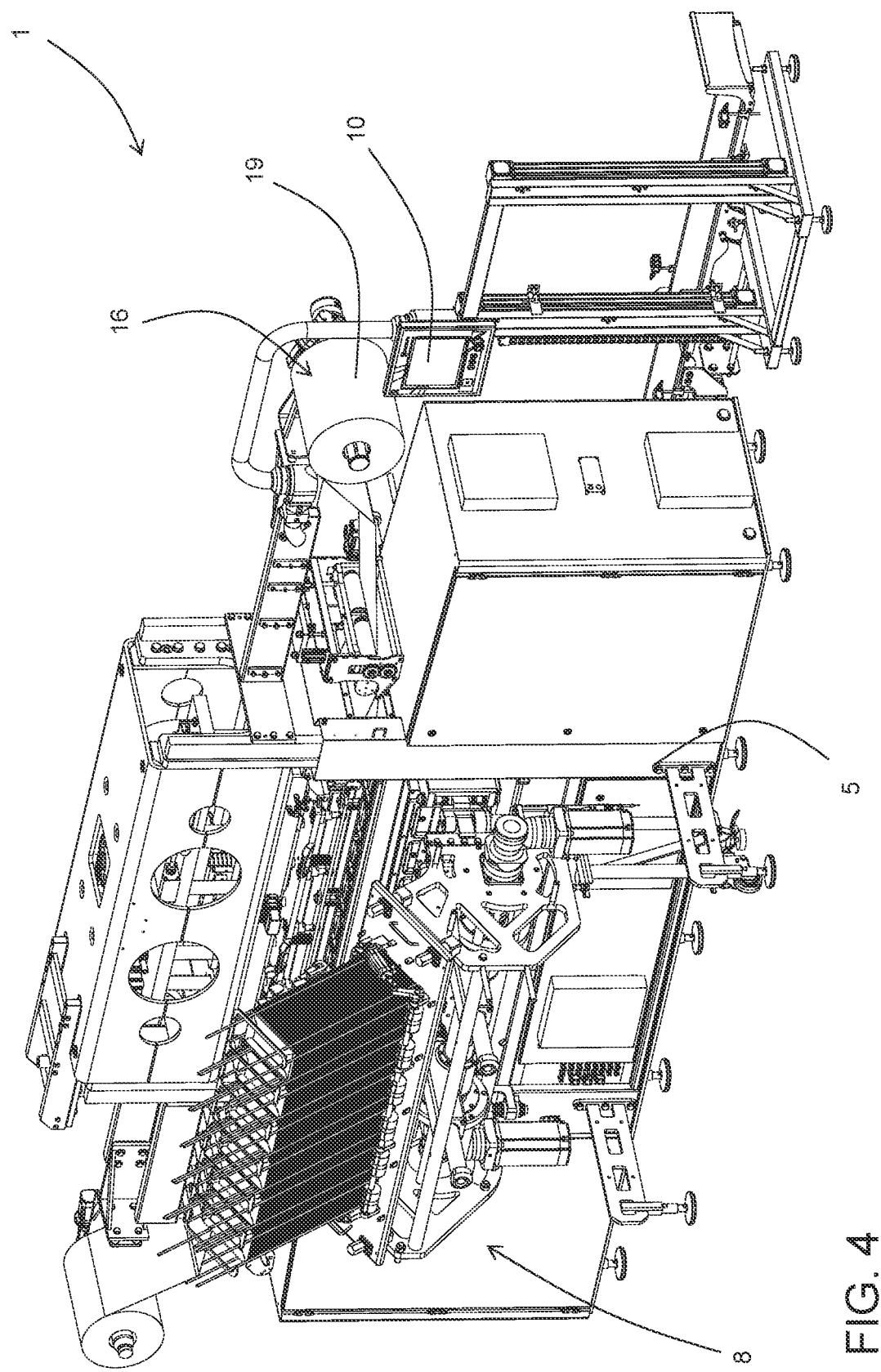
FIG. 4 is an axonometric view of the apparatus of FIG. 1 without some protective casings so as to make the internal structure visible.
Figure 5:
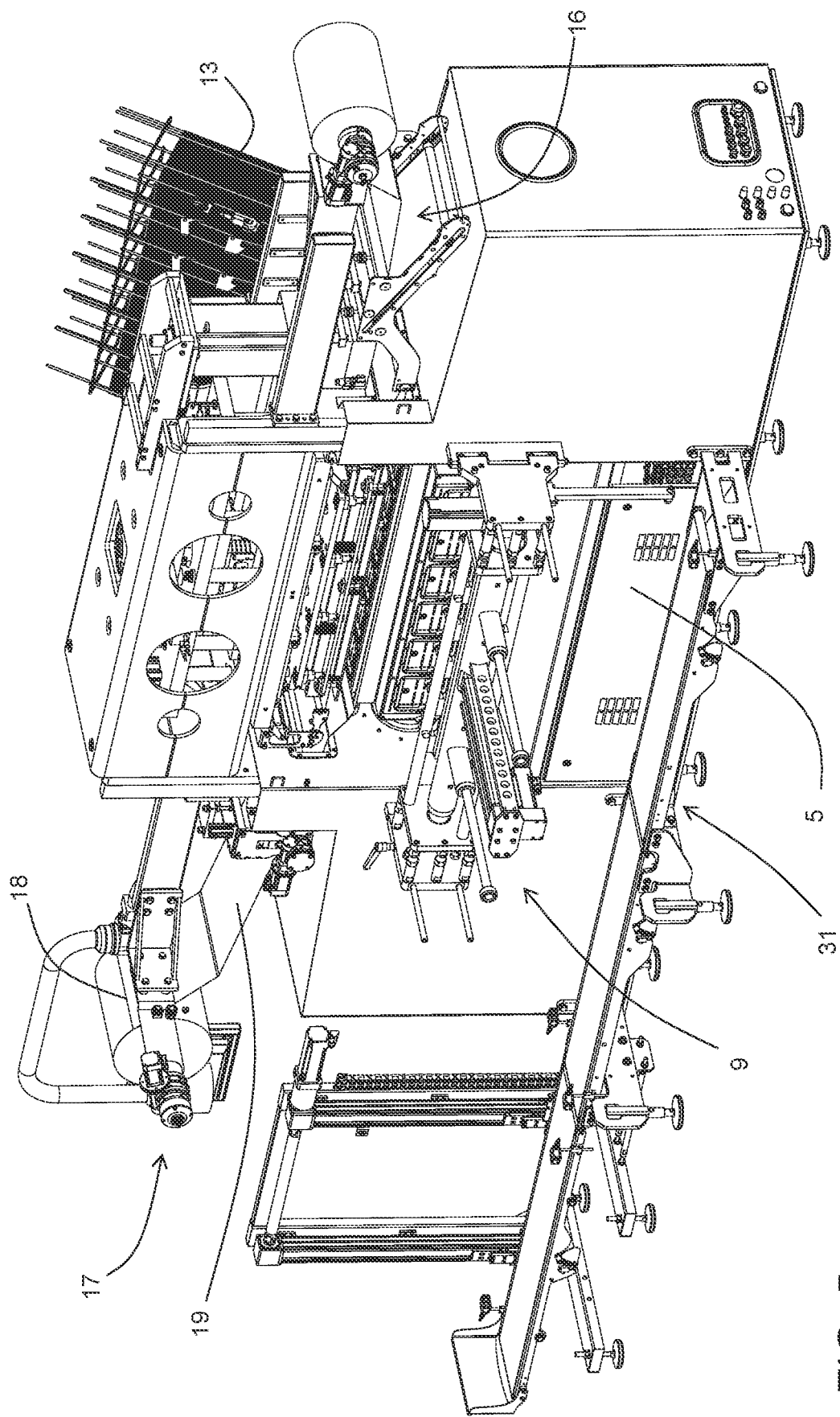
FIG. 5 is an axonometric view from the opposite side, of the apparatus of FIG. 4.
Figure 6:
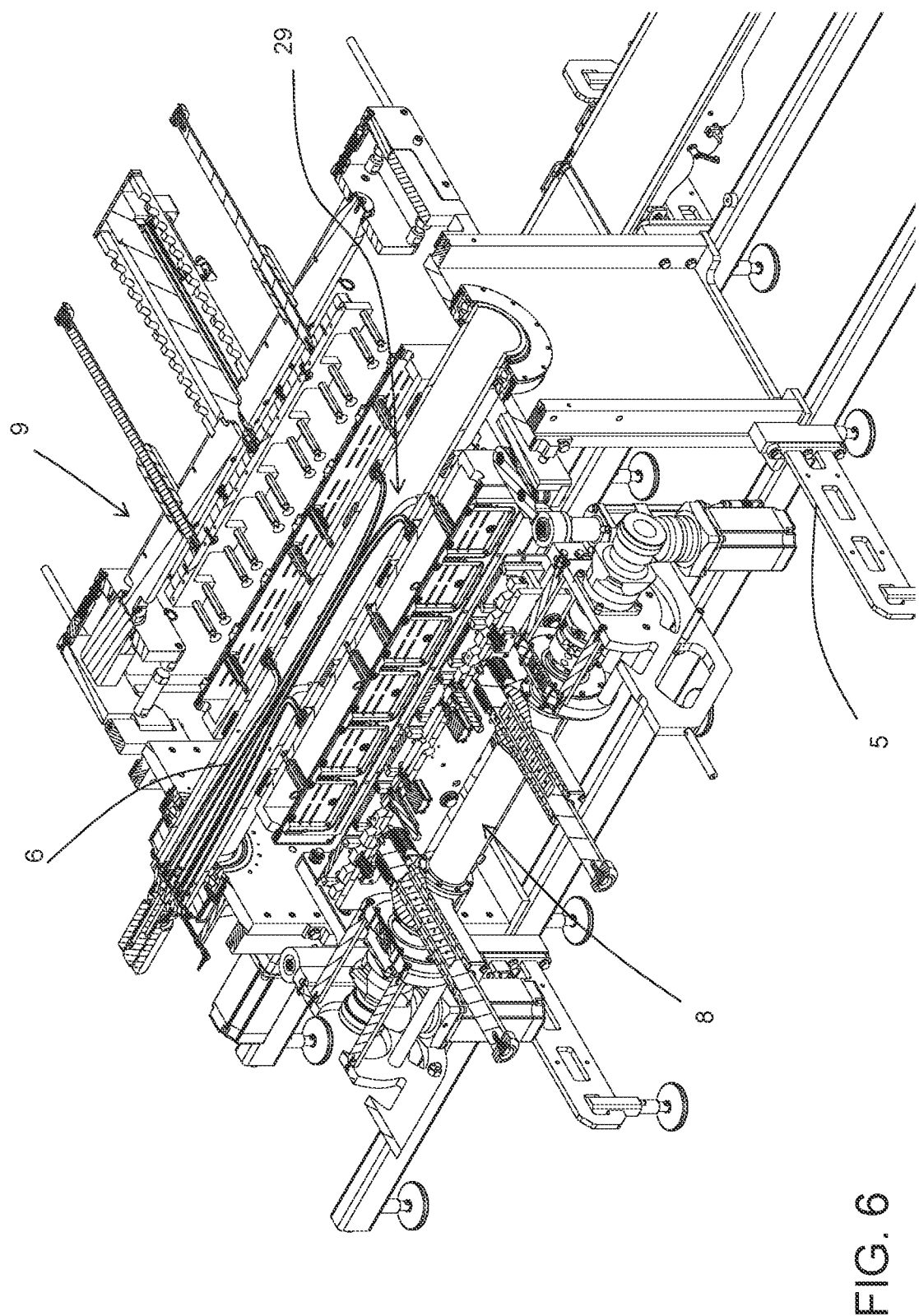
FIG. 6 is an axonometric view of a part of the apparatus of FIG. 4 horizontally sectioned with a plane passing through the main axis of rotation of a rotor thereof.
Figure 7:
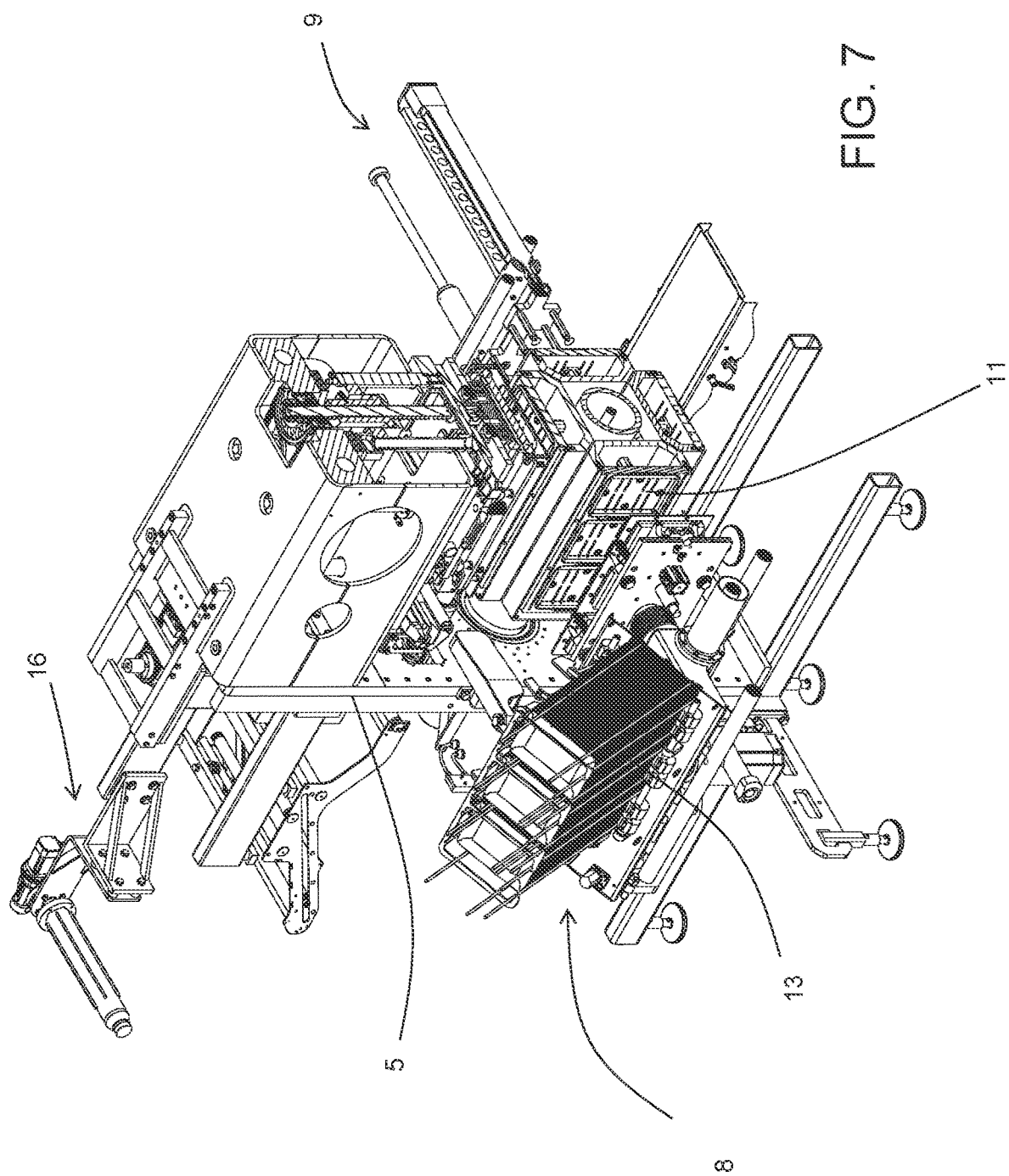
FIG. 7 is an axonometric view of a part of the apparatus of FIG. 4 vertically sectioned perpendicularly to the main axis of rotation of the rotor.
Figure 8:
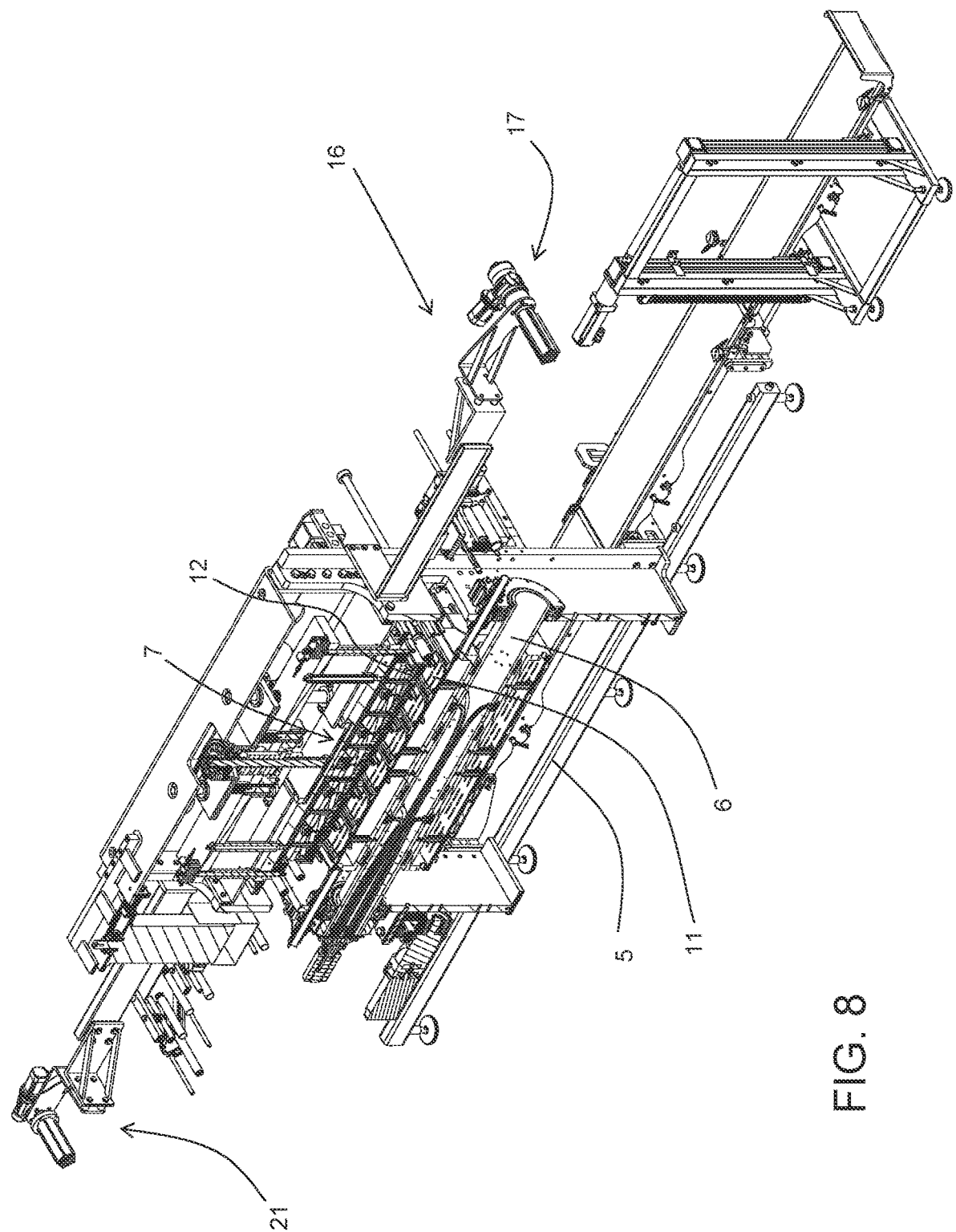
FIG. 8 is an axonometric view of the apparatus of FIG. 4 vertically sectioned with a plane passing through the main axis of rotation of the rotor.

As illustrated in FIGS. 2 and 3, in some embodiments, the supporting structure 5 comprises a central body 37 which supports the rotor 6, a first wing 38 which supports the feeding device 8 and a second wing 39 which supports the extracting device 9. The first wing 38 and the second wing 39 are switchable between an operating configuration and a maintenance configuration. When the first wing 38 is in the respective operating configuration, the feeding device 8 is coupled to the rotor 6, whilst when the second wing 39 is in the respective operating configuration, the extracting device 9 is coupled to the rotor 6. Otherwise, when the first wing 38 and the second wing 39 are in the respective maintenance configuration, the feeding device 8 and the extracting device 9 are spaced apart from the rotor 6 in such a way as to allow access to the rotor 6 itself by an operator. In the embodiment illustrated in the accompanying figures, the first wing 38 and the second wing 39 are connected to the central body 37 in such a way that they can rotate around a vertical axis of rotation.

FIGS. 11 to 24 show the execution of a cycle for making a container 2. In those figures operation of the apparatus 1 is illustrated by way of example, exclusively with reference to a single supporting unit 11, and what are not shown are the operations which are simultaneously performed on the other supporting units 11 which are distributed around the rotor 6 at the same axial position along the main axis of rotation.

Figure 11:
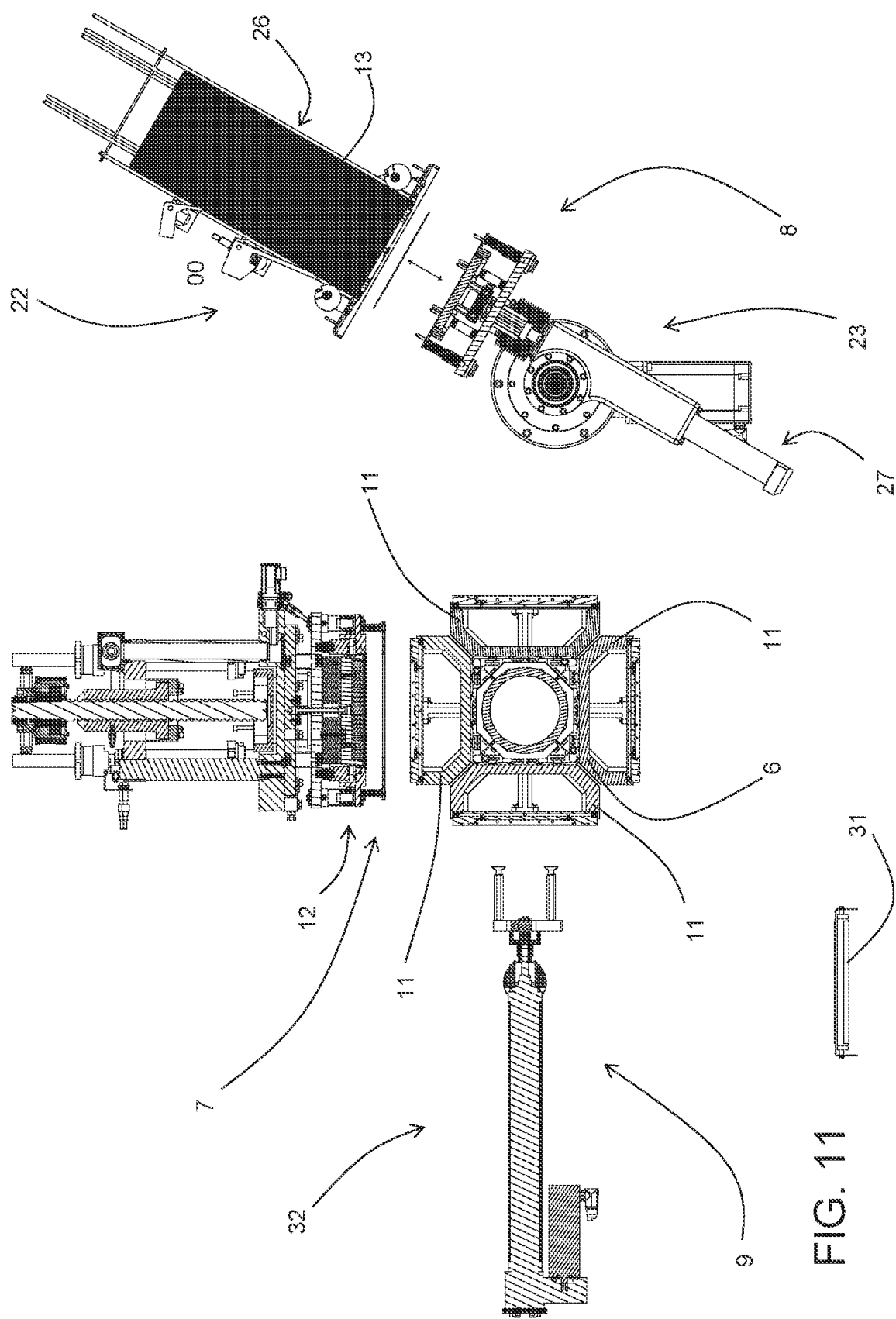
FIG. 11 is a vertical section perpendicular to the main axis of rotation of the rotor, of some main components of the apparatus of FIG. 1 at the start of an example production cycle.

FIG. 11 shows all parts of the apparatus 1 which take part in the various operations, in the initial situation. In contrast, the other figures show, enlarged, only the individual parts involved in a specific operating step.

When the supporting unit 11 is positioned in the loading predetermined angular position, the extendable arm 27 moves to the first position (FIG. 12); then it changes to the extended configuration to couple the gripping head 28 to the first feeder 22 and to pick up a first article 13, then it returns to the retracted configuration (movements schematically indicated by the arrow and by the first article 13 extracted from the stack 26 and suspended in the air in FIG. 12).

Figure 14:
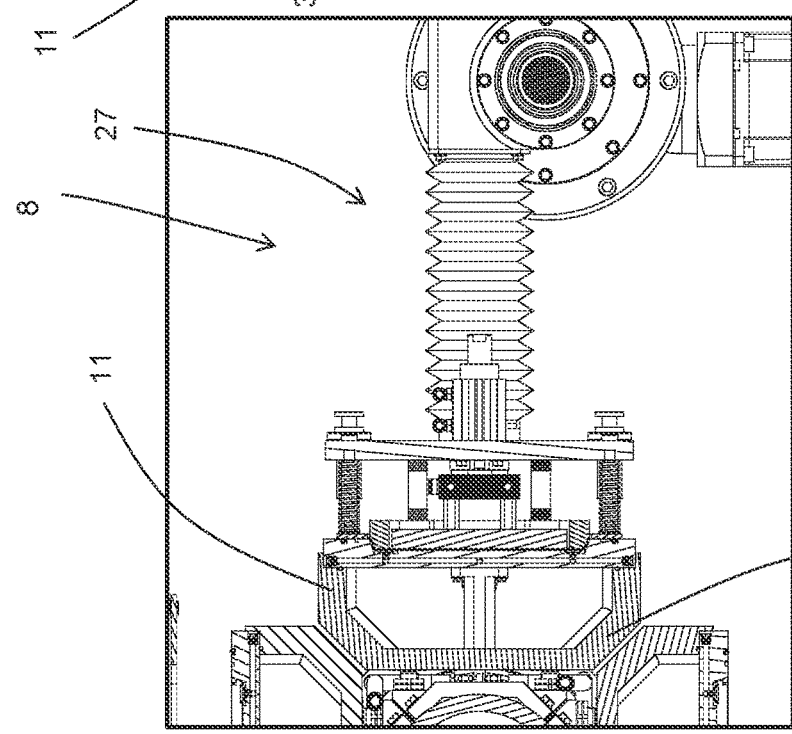

The extendable arm 27 then rotates to the second position (FIG. 13) and again changes to the extended configuration coupling to the supporting unit 11 (FIG. 14). At that point the thrust unit 30 changes from the retracted position (visible in FIG. 12) to the forward position (FIG. 15) inserting itself inside the shaped housing 15 to shape in a corresponding way the first article 13, which is accepted by the second suction means 29.

Figure 16:
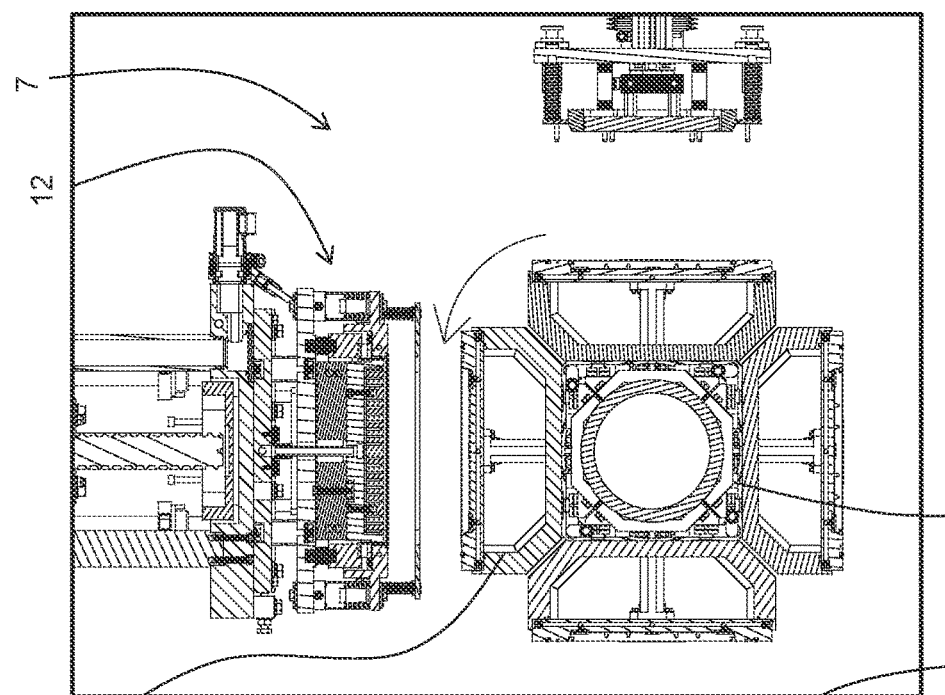

Once the extendable arm 27 has returned to the retracted configuration, the rotor 6 rotates one step to bring the supporting unit 11 to the thermoforming predetermined angular position (FIG. 16).

Figure 17:
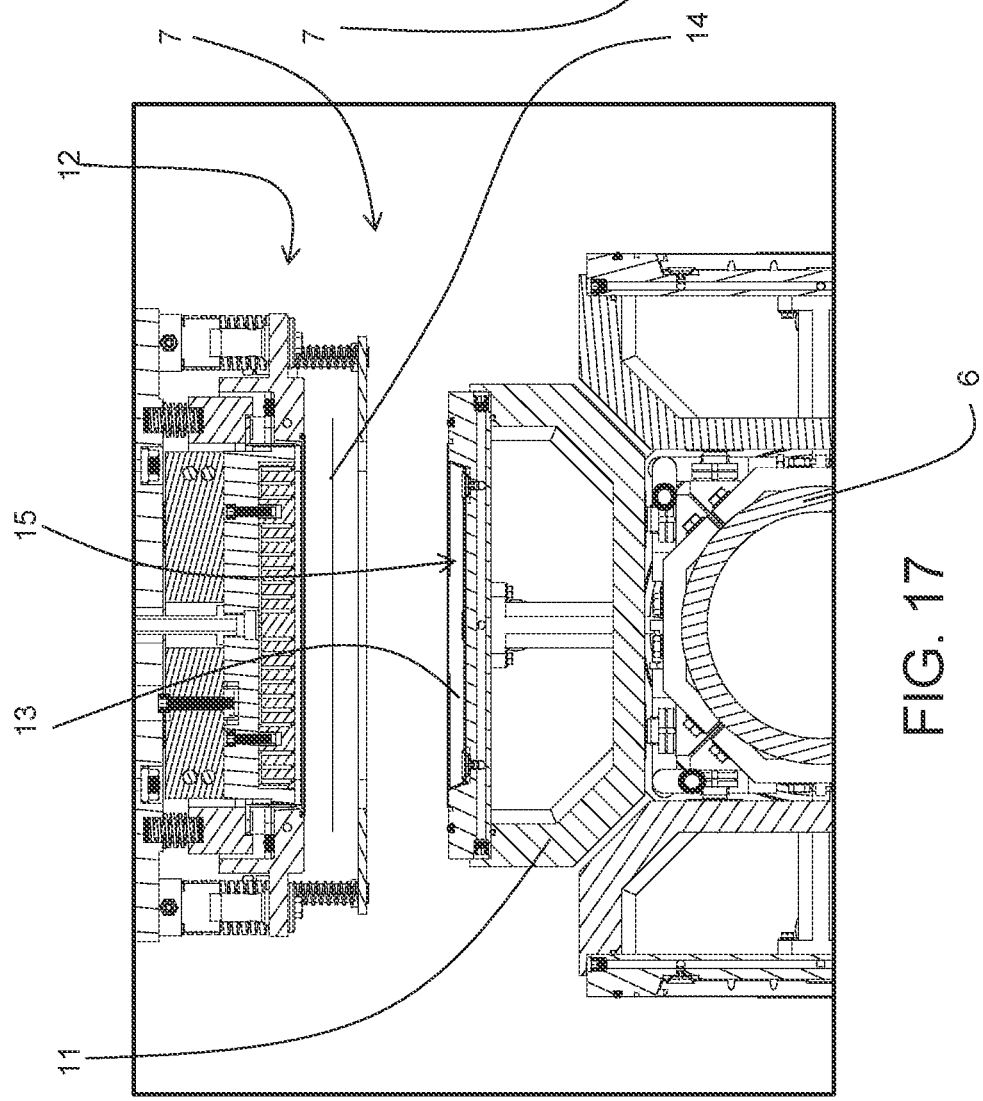

If it is not already ready, the positioning device 16 is activated to position a sheet of thermoformable material 14 between the supporting unit 11 and the closing unit 12 (FIG. 17, in which the sheet is still an integral part of the web 19).

Figure 18:
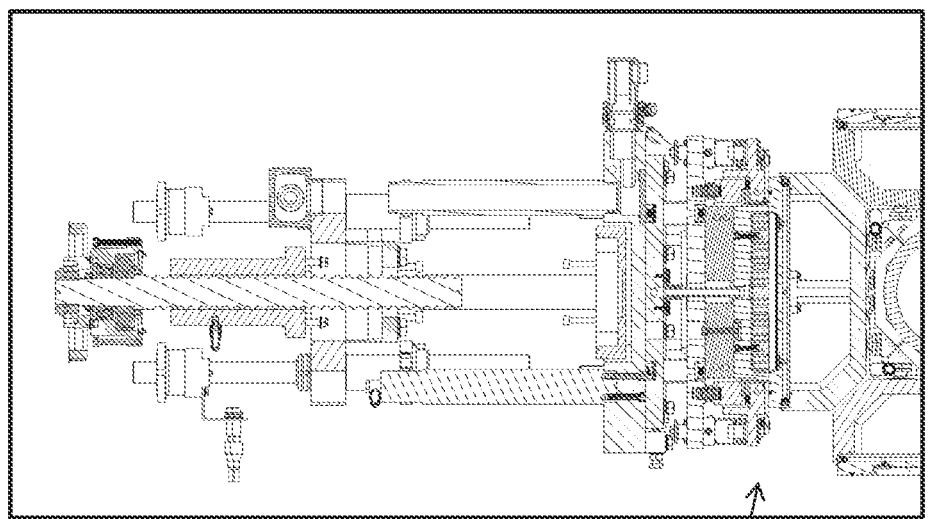
Figures 19, 20:
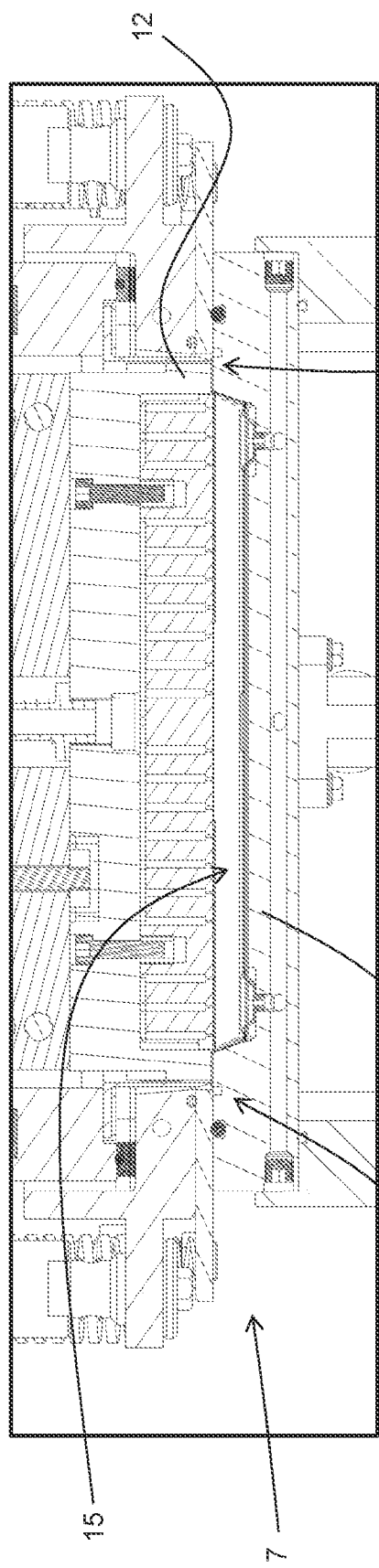

Then the closing unit 12 is moved from the disengaged position to the operating position and the thermoforming operation is carried out (FIG. 18 and relative enlargement of FIG. 19). At the end of the thermoforming, before making the closing unit 12 return to the disengaged position, if necessary the cutting means 20 may be activated to separate the sheet of thermoformable material 14 from the rest of the web 19 (not illustrated).

Once the closing unit 12 has returned to the disengaged position, the rotor 6 rotates another step (FIG. 20), bringing the supporting unit 11 to the unloading predetermined angular position.

At that point, the pick-up unit 32 rotates to its first position and switches from the retracted configuration to the extended configuration in such a way that the gripping unit 33 is coupled to the supporting unit 11 and to the container 2 present in it (FIG. 21).

Figure 24:
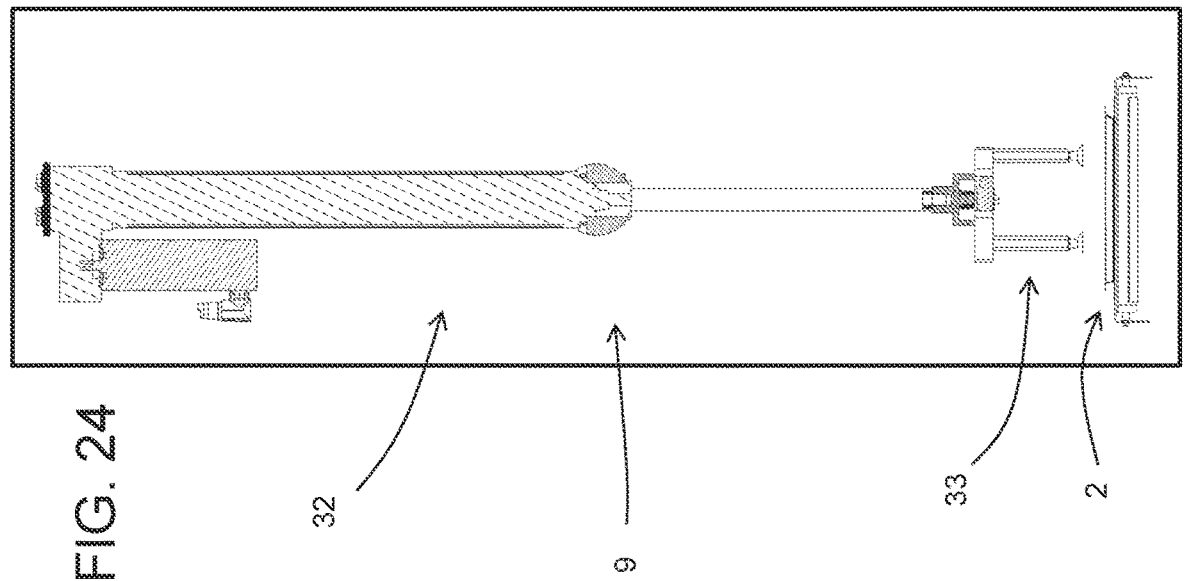
Figure 23:
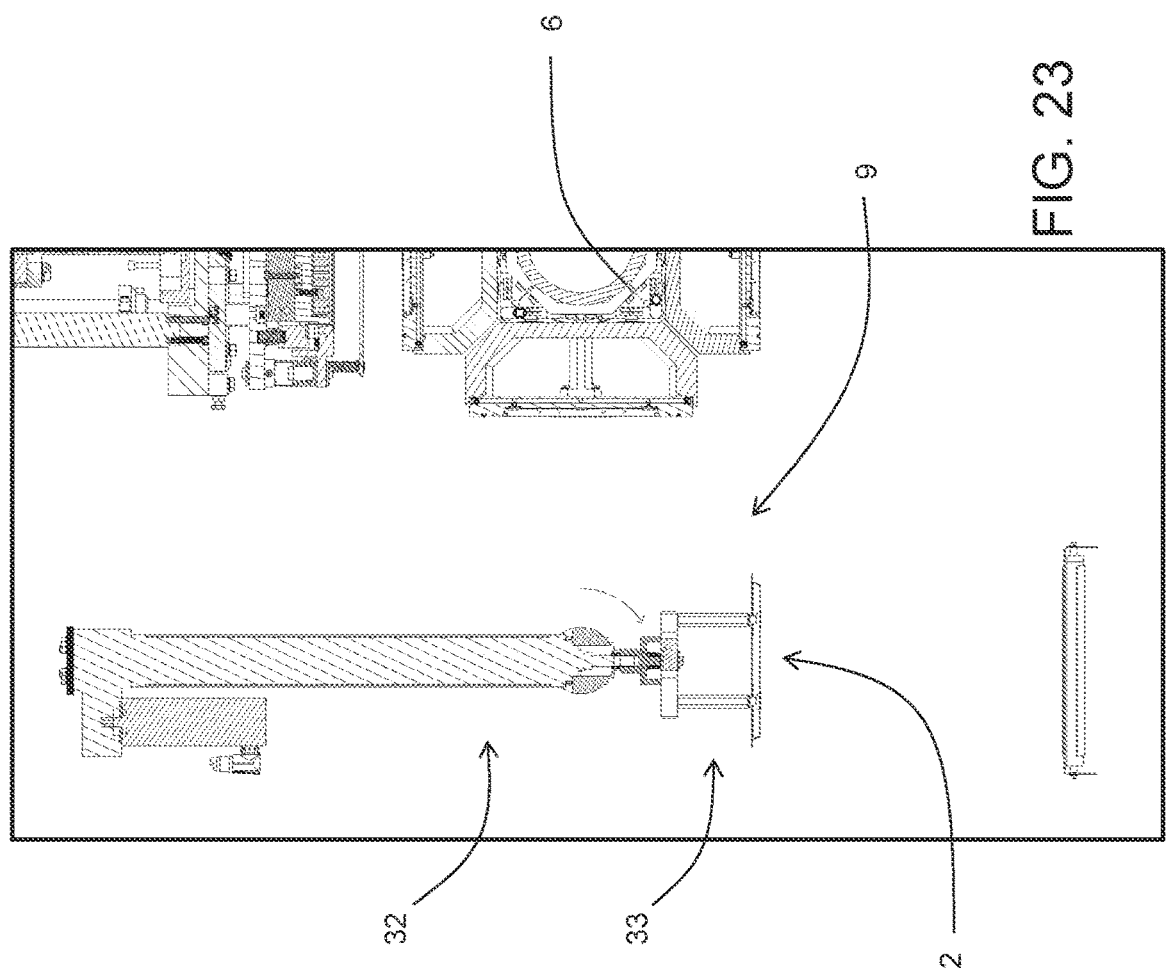

The pick-up unit 32 again switches to the retracted configuration (FIG. 22), after which it rotates to the second position (FIG. 23) and again switches to the extended configuration to unload the container 2 on the outfeed conveyor 31 (FIG. 24).

It should be noticed that the extended configuration adopted by the pick-up unit 32 may be different when it is coupled to the supporting unit 11 and when it is coupled to the outfeed conveyor 31, and also it may vary based on the number of containers 2 already present in the pack 36 being formed on the outfeed conveyor 31 (as the number of containers 2 increases the stroke of the pick-up unit 32 is reduced).

Once the container 2 has been picked up by the pick-up unit 32, the rotor 6 is free to continue the rotation. At that point two steps are necessary to return the supporting unit 11 to the initial position (FIG. 12) and to be able to start a new cycle. During normal operation, each of those two new steps corresponds to the arrival in the unloading predetermined angular position of a further supporting unit 11 and the consequent unloading of a new container 2.

Figure 10:
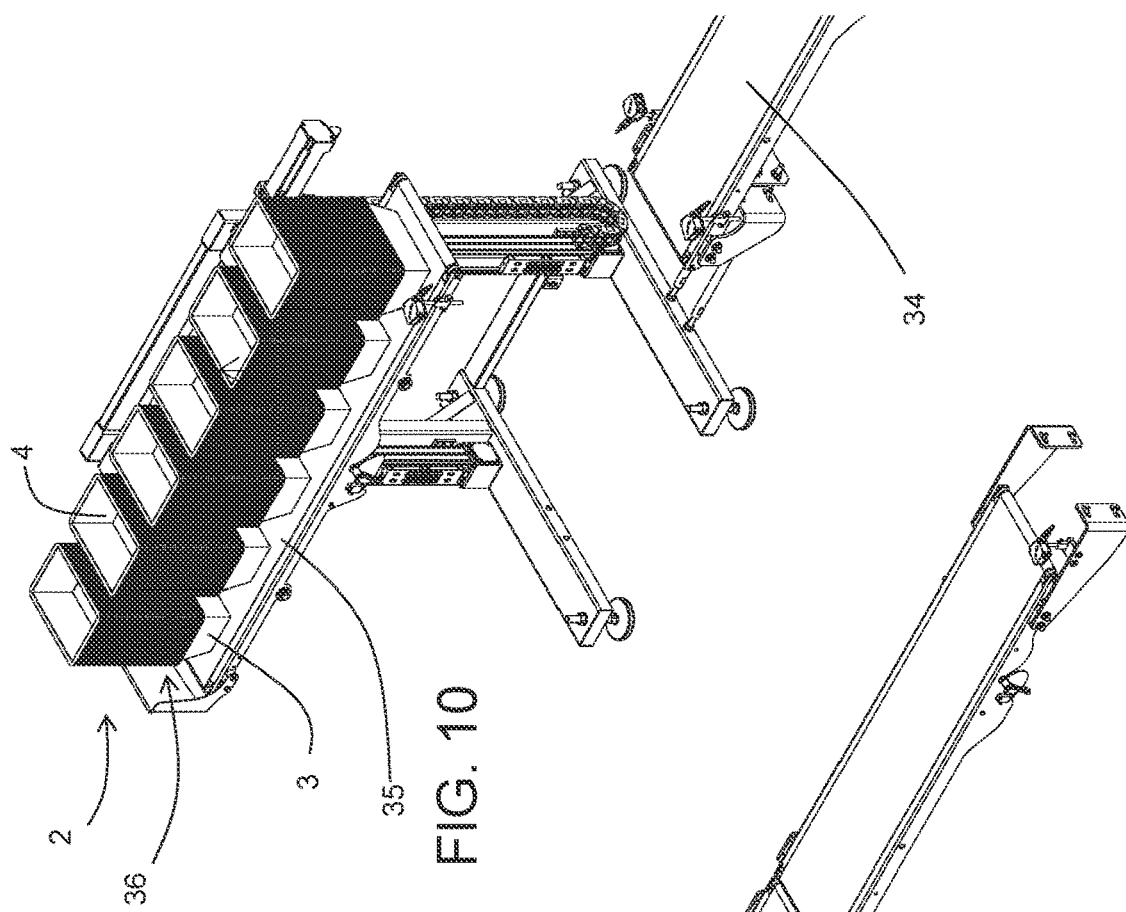
FIG. 10 shows, in an enlarged view, a detail of the outfeed conveyor of FIG. 9, in a second operating configuration.
Figure 9:
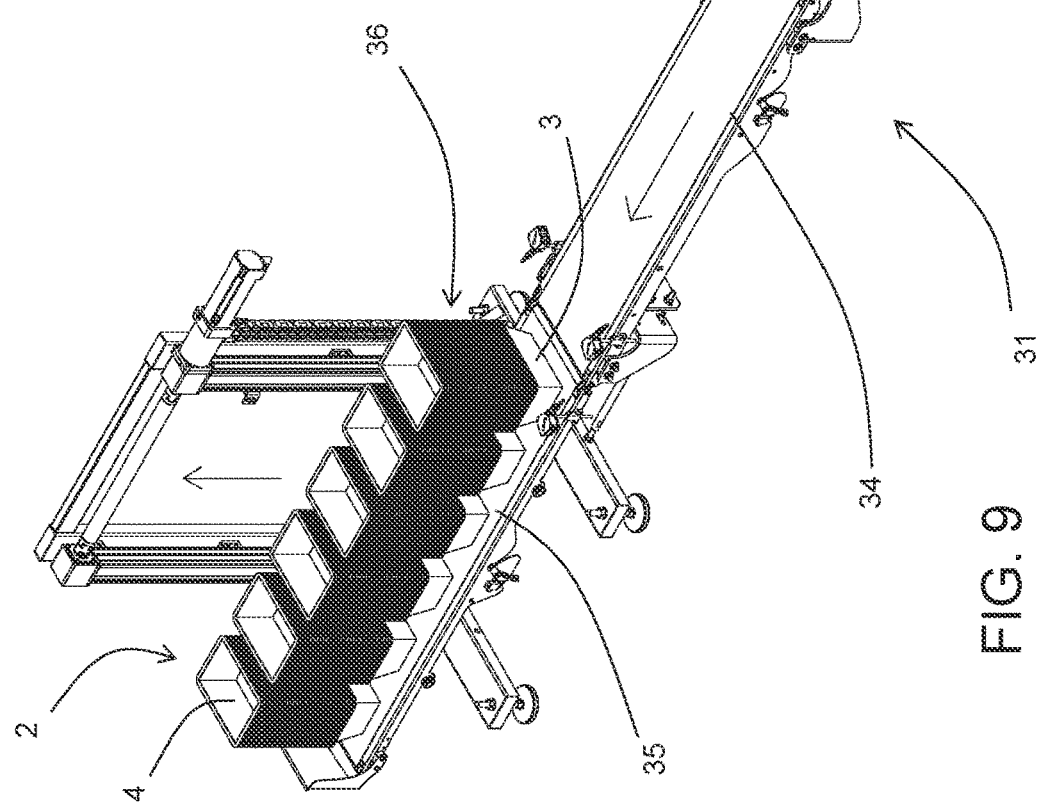
FIG. 9 is an axonometric view of an outfeed conveyor of the apparatus of FIG. 1, in a first operating configuration.

Once a corresponding pack 36 of containers 2 has been created on the outfeed conveyor 31 for each thermoforming device 7, the outfeed conveyor is activated to transfer the packs 36 from the lowered stretch 34 to the movable stretch 35 (FIG. 9), and then to lift the movable stretch 35 to the outfeed height necessary (FIG. 10).

This invention brings important advantages.

In fact, thanks to this invention, an apparatus 1 for making containers 2 which comprise a supporting skeleton 3 and a layer of thermoformable material 4 coupled to the supporting skeleton 3 was provided, which allows the entire container 2 to be made in an automated way starting from its starting constituent parts.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making containers (2) which comprise a supporting skeleton (3) and a layer of thermoformable material (4) coupled to the supporting skeleton (3), comprising:
    a supporting structure (5);
    a motor-driven rotor (6) mounted on the supporting structure (5) and rotatable around a main axis of rotation;
    a thermoforming device (7) comprising a supporting unit (11) and a closing unit (12), the supporting unit (11) being mounted on the rotor (6) and the closing unit (12)

being mounted on the supporting structure (5) in such a way that it is stationary relative to the rotation of the rotor (6);

a feeding device (8) for feeding to the supporting unit (11) mounted on the rotor (6), a first article (13) for making the supporting skeleton (3);

a positioning device (16) for positioning a sheet of thermoformable material (14) between the supporting unit (11) mounted on the rotor (6) and the closing unit (12) stationary relative to the rotation of the rotor (6); and an extracting device (9) configured to extract the containers (2) from the supporting unit (11) mounted on the rotor (6);

wherein:

the rotor (6) is configured to rotate in a stepping fashion to position the supporting unit (11) at a plurality of predetermined angular positions one after another, which are distributed around the main axis of rotation;

the feeding device (8), the closing unit (12) stationary relative to the rotation of the rotor (6) and the extracting device (9) are distributed around the main axis of rotation;

the feeding device (8) is configured to feed a first article (13) to the supporting unit (11), when the supporting unit (11) is at a loading predetermined angular position of said plurality of predetermined angular positions;

the extracting device (9) is configured to pick up a container (2) from the supporting unit (11), when the supporting unit (11) is at an unloading predetermined angular position of said plurality of predetermined angular positions;

when the supporting unit (11) is positioned in a thermoforming predetermined angular position of said plurality of predetermined angular positions, which is intermediate between the loading predetermined angular position and the unloading predetermined angular position, at least one of either the closing unit (12) or the supporting unit (11) is movable relative to the other between a disengaged position in which they are spaced apart and allow the rotation of the rotor (6), and an operating position in which they are coupled for thermoforming the sheet of thermoformable material (14) on the first article (13); and the positioning device (16) is configured to position the sheet of thermoformable material (14) between the supporting unit (11) and the closing unit (12), when the supporting unit (11) and the closing unit (12) are in the disengaged position and before they adopt the operating position.

2. The apparatus according to claim 1 wherein the thermoforming device (7) comprises a closing unit (12) and a plurality of supporting units (11) alternatively couplable to the closing unit (12), wherein the supporting units (11) are mounted on the rotor (6) and are distributed around the main axis of rotation, and wherein with each step of the rotation of the rotor (6) each supporting unit (11) shifts from one predetermined angular position of said plurality of predetermined angular positions to another predetermined angular position of said plurality of predetermined angular positions.

3. The apparatus according to claim 1 comprising a plurality of thermoforming devices (7) each of which comprises at least one supporting unit (11) and one closing unit (12), for each thermoforming device (7) the supporting unit (11) being mounted on the rotor (6) and the closing unit (12) being mounted on the supporting structure (5) in such a way that it is stationary relative to the rotation of the rotor (6), wherein the supporting units (11) of each thermoforming device (7) are mounted on the rotor (6) alongside each other along a line tangential to the main axis of rotation and are movable together in each predetermined angular position of said plurality of predetermined angular positions, and wherein the closing units (12) are configured to simultaneously interact with the respective supporting units (11).

4. The apparatus according to claim 1 comprising a plurality of thermoforming devices (7) each of which comprises at least one supporting unit (11) and one closing unit (12), for each thermoforming device (7) the supporting unit (11) being mounted on the rotor (6) and the closing unit (12) being mounted on the supporting structure (5) in such a way that it is stationary relative to the rotation of the rotor (6), wherein the supporting units (11) of each thermoforming device (7) are mounted on the rotor (6) alongside each other along a line parallel to the main axis of rotation and are movable together in each predetermined angular position of said plurality of predetermined angular positions, and wherein the closing units (12) are configured to simultaneously interact with the respective supporting units (11).

5. The apparatus according to claim 3 also comprising a feeding device (8) and an extracting device (9) for each thermoforming device (7), or wherein the feeding device (8) and the extracting device (9) are associated with all of the thermoforming devices (7).

6. The apparatus according to claim 1 wherein the feeding device (8) comprises a first feeder (22) for feeding first articles (13) and a first transfer device (23) for transferring a first article (13) from the first feeder (22) to the supporting unit (11), the first transfer device (23) being switchable between a first configuration, in which it is coupled to the first feeder (22) for picking up a first article (13), and a second configuration, in which it is coupled to the supporting unit (11) for releasing the first article (13) to it.

7. The apparatus according to claim 6, wherein the first feeder (22) is configured to contain shaped first articles (13) which constitute the supporting skeleton (3) and/or is a storage unit configured to allow the picking up of a first article (13) from the base of a stack (26) of first articles (13).

8. The apparatus according to claim 1, wherein the feeding device (8) is configured to feed one after another to the supporting unit (11), both a first article (13), and a second article for making the supporting skeleton (3).

9. The apparatus according to claim 8, wherein the feeding device (8) is configured to feed to the supporting unit (11) a first article (13) at a predetermined angular position of said plurality of predetermined angular positions, and a second article at a different predetermined angular position of said plurality of predetermined angular positions.

10. The apparatus according to claim 9, wherein the feeding device (8) comprises a gluing unit configured to apply an adhesive to at least one of either the first article (13) or the second article, at a zone of them configured for superposing them.

11. The apparatus according to claim 10 wherein the feeding device (8) comprises a second feeder for feeding second articles (13) and a second transfer device for transferring a second article from the second feeder to the supporting unit (11), the second transfer device being switchable between a first configuration, in which it is coupled to the second feeder for picking up a second article, and a second configuration, in which it is coupled to the supporting unit (11) for releasing the second article to it.

12. The apparatus respectively according to claim 11, wherein the second feeder for feeding second articles (13) is a storage unit configured to allow the picking up of a second article from the base of a stack (26) of second articles (13).

13. The apparatus according to claim 1 wherein the supporting unit (11) comprises a shaped housing (15) into which the first article (13) and the sheet of thermoformable material (14) can be inserted.

14. The apparatus according to claim 13, wherein the feeding device (8) is also configured to push the first article (13) into the shaped housing (15) deforming it.

15. The apparatus according to claim 9, wherein the supporting unit (11) comprises a shaped housing (15) into which the first article (13) and the sheet of thermoformable material (14) can be inserted and wherein the feeding device (8) is also configured to push the first article (13) into the shaped housing (15) deforming it, and wherein the feeding device (8) is also configured to push the second article into the shaped housing (15) deforming it.

16. The apparatus according to claim 15, wherein the feeding device (8) comprises a second feeder for feeding second articles (13) and a second transfer device for transferring a second article from the second feeder to the supporting unit (11), the second transfer device being switchable between a first configuration, in which it is coupled to the second feeder for picking up a second article, and a second configuration, in which it is coupled to the supporting unit (11) for releasing the second article to it, wherein the second transfer device comprises a thrust unit (30) and wherein, when the second transfer device is in the second configuration, the thrust unit (30) is movable between a retracted position, in which it is located outside the shaped housing (15), and a forward position, in which it is inserted inside the shaped housing (15) for, in use, deforming the second article inside the shaped housing (15).

17. The apparatus according to claim 1, wherein the apparatus (1) also comprises an outfeed conveyor (31), and wherein the extracting device (9) comprises at least one pick-up unit (32) movable between a gripping position, in which it is coupled to the supporting unit (11) for gripping a container (2) placed in the supporting unit (11), and a releasing position, in which it is coupled to the outfeed conveyor (31) for releasing the container (2) on the outfeed conveyor (31).

18. The apparatus according to claim 17, wherein the outfeed conveyor (31) comprises a lowered stretch (34) with which the pick-up unit (32) is associated when it is in the releasing position, and a movable stretch (35) placed downstream of the lowered stretch (34) relative to a forward movement path of the containers (2) on the outfeed conveyor (31), and wherein the movable stretch (35) is configured to shift between a first position in which it is aligned with the lowered stretch (34) for receiving the containers (2) from the lowered stretch (34), and a second position in which it is placed at a height higher than the first position.

19. The apparatus according to claim 1, wherein the supporting structure (5) comprises a central body (37) which supports the rotor (6), a first wing (38) which supports the feeding device (8) and a second wing (39) which supports the extracting device (9), wherein the first wing (38) and the second wing (39) are switchable between an operating configuration and a maintenance configuration, wherein when the first wing (38) is in the operating configuration the feeding device (8) is coupled to the rotor (6), wherein when the second wing (39) is in the operating configuration the extracting device (9) is coupled to the rotor (6), and wherein when the first wing (38) and the second wing (39) are in the respective maintenance configuration the feeding device (8) and the extracting device (9) are spaced apart from the rotor (6) and allow access to the rotor (6) itself by an operator.

20. The apparatus according to claim 6, wherein the feeding device (8) is also configured to push the first article (13) into the shaped housing (15) deforming it, wherein the first transfer device (23) comprises a thrust unit (30) and wherein, when the first transfer device (23) is in the second configuration, the thrust unit (30) is movable between a retracted position, in which it is located outside the shaped housing (15), and a forward position, in which it is inserted inside the shaped housing (15) for, in use, deforming the first article (13) inside the shaped housing (15).

\* \* \* \* \*